US005532881A

United States Patent [19]

Nakatsuji et al.

[11] Patent Number: 5,532,881

[45] Date of Patent: * Jul. 2, 1996

[54] ZOOM LENS UTILIZING INNER FOCUS SYSTEM

[75] Inventors: Masahiro Nakatsuji, Kanagawa; Kenzaburo Suzuki, Tokyo, both of Japan

[73] Assignee: Nikon Corporation, Tokyo, Japan

[ * ] Notice: The term of this patent shall not extend beyond the expiration date of Pat. No. 5,325,233.

[21] Appl. No.: 266,272

[22] Filed: Jun. 27, 1994

Related U.S. Application Data

[63] Continuation-in-part of Ser. No. 33,034, Mar. 18, 1993, Pat. No. 5,325,233.

[30] Foreign Application Priority Data

Mar. 25, 1992 [JP] Japan .................................... 4-067256

[51] Int. Cl.[6] .................................................... G02B 15/14

[52] U.S. Cl. ............................................ 359/684; 359/683

[58] Field of Search ..................................... 359/683, 684

[56] References Cited

U.S. PATENT DOCUMENTS 3,482,900 12/1969 Wagner .................................. 359/683

5,189,557 2/1993 Endo ...................................... 359/684

5,325,233 6/1994 Nakatsuji et al. ...................... 359/684

FOREIGN PATENT DOCUMENTS 60-175020A 9/1985 Japan .................................... 359/764

*Primary Examiner*—Georgia Y. Epps

*Assistant Examiner*—Michael A. Papalas

*Attorney, Agent, or Firm*—Keck, Mahin & Cate

[57] ABSTRACT

A zoom lens of five group construction utilizing an inner focus system. The zoom lens includes a first lens group G1 having a positive refracting power, a second lens group G2 having a negative refracting power, a third lens group G3 having a negative refracting power, a fourth lens group G4 having a positive refracting power and a fifth lens group G5 having a negative refracting power, which are arranged in this order from an object side, and the distances among the respective lens groups are selectively varied to effect the desired zooming operation. During close-up photographing, the second lens group G2 is moved along an optical axis to effect the desired focusing.

12 Claims, 4 Drawing Sheets

ZOOM LENS UTILIZING INNER FOCUS SYSTEM

This application is a continuation-in-part of application Ser. No. 08/033,034, filed Mar. 18, 1993 issed as U.S. Pat. No. 5,325,233 on Jun. 28, 1994.

BACKGROUND OF THE INVENTION

1. Field of the Invention

The present invention relates to a zoom lens utilizing inner focus system and more particularly to a zoom lens including focusing lens groups which are small in size and light in weight and which are well suited for automatic focusing.

2. Description of the Prior Art

The focusing methods of known zoom lenses have been generally so designed that of all the lens groups, the lens group closest to the object side is moved out to effect the focusing. Presently, this method has been used chiefly with the existing zoom lenses owing to the fact that the lens barrel construction can be made relatively simple and moreover the focusing can be effected through substantially a given amount of movement over the whole zooming range with an object at the same distance.

However, generally the most-object-side lens of the zoom lens requires the largest diameter and therefore it tends to be largest in weight. Therefore, where the most-object-side lens group is moved as a focusing group, there are disadvantages such as a problem of weight balance and deterioration of the performance due to flexture, whereas if it is used for automatic focusing purposes, not only the focusing speed is decreased but also the load on the focusing motor is increased.

As a result, recently there has existed a demand for reduction in the weight of the focusing group and various focusing methods have been proposed in known literatures including Japanese Laid-Open Patents No. 52-109952, No. 56-21112 and No. 59-33418.

In the zoom lens described in Japanese Laid-Open Patent No. 52-109952, the most-object-side, large-diameter lens group is divided into three parts so as to use the resulting intermediate lenses as a focusing group and therefore there are disadvantages that not only the lens diameter is increased and there is less possibility of remarkably decreasing the weight of the focusing group but also the number of the lenses in the group is increased and the weight balance of the lens on the whole is deteriorated. Also, in the zoom lens disclosed in Japanese Laid-Open Patent No. 56-21112, the number of the constituting lenses of the focusing group is large as compared with its diameter thus failing to serve the effect of reducing the weight. Moreover, this focusing system has the disadvantage of lacking versatility in that it is limited to the zoom lenses whose lens type is the four group construction and including an afocal portion and it has no versatility. On the other hand, Japanese Laid-Open Patent No. 59-33418 discloses a zoom lens so designed that the focusing is effected by using a part of the most-image-side fixed imaging lens group as a focusing lens group and therefore, while the focusing group is reduced in diameter and in the number of the constituting lenses with the resulting reduction in weight, in the case of an object at the same distance variation in the amount of movement is increased with shift from the wide-angle range to the telephoto range with the result that the air spacing required for this purpose must be ensured thus increasing the whole length of the lens.

SUMMARY OF THE INVENTION

It is therefore the primary object of the present invention to provide a zoom lens which overcomes the foregoing deficiencies of the known zoom lenses and which is so designed that the proper air spacing for an amount of movement of a focusing lens group from the wide-angle range to the telephoto range relative to an object at the same distance is ensured and moreover the focusing lens group is made lighter and more compact so as to be adapted for automatic focusing.

To accomplish the above object, in accordance with the present invention there is thus provided a zoom lens including, in the order from the side of an object, a first lens group having a positive refracting power, a second lens group having a negative refracting power, a third lens group having a negative refracting power, a fourth lens group having a positive refracting power and a fifth lens group having a negative refracting power whereby during the period of zooming, with the second lens group being left stationary, the first and third lens groups are moved so as to vary their respective lens group spacing relative to the second lens group and the third, fourth and fifth lens groups are moved relative to one another so as to vary their relative lens group spacings, whereas during the period of focusing only the second lens group is moved so as to vary the lens spacing between the second lens group and the first and third lens groups, respectively.

With the zoom lens of the present invention constructed as described above, if $\beta 2$ min is the minimum value of a working magnification $|\beta 2|$ at infinity of the second lens group, the focusing lens group or the second lens group shoud preferably be constructed so as to satisfy the following condition $$\beta 2\ \mathrm{min} > 1.7$$

The above-mentioned lens type of the five-group construction features that of the whole zoom lens, its image side is the telephoto type of the two or positive and negative group construction thus reducing the whole length and its object side is the three or positive, negative and negative group construction and thus the zoom lens is composed of the five groups or the positive, negative, negative, positive and negative groups arranged in this order from the object side. In accordance with preferred embodiments of the present invention, the features of such multiple group construction are fully utilized to provide telephoto zoom lenses which are more compact and suitable for realizing higher zooming ratios.

In accordance with the present invention, particularly at the telephoto end as compared with the wide-angle end, the spacing between the second lens group G2 of the negative refracting power and the third lens group G3 of the negative refracting power is increased and the spacing between the third lens group G3 of the negative refracting power and the fourth lens group G4 of the positive refracting power is decreased thereby intensifying the zooming action. Also, not only it is easy to make the whole length more compact and ensure the back focus at the wide-angle end but also the whole length can be prevented from being increased at the telephoto end.

Therefore, while, in the case of the zoom lens utilizing an inner focus system, the necessary space for movement must be ensured for the focusing lens group, the whole length of this lens type is so small that the desired compact inner-focus zoom lens can be realized even if the moving space of the focusing lens group for inner focus is ensured. Further, the focusing lens group has a reduced number of lenses and is small in size and therefore it can ensure a rapid focusing in the automatic focusing.

The above and other objects, features and advantages of the present invention will become more apparent from the following detailed description of its preferred embodiments taken in conjunction with the accompanying drawings.

DESCRIPTION OF THE PREFERRED EMBODIMENTS

Figure 1:
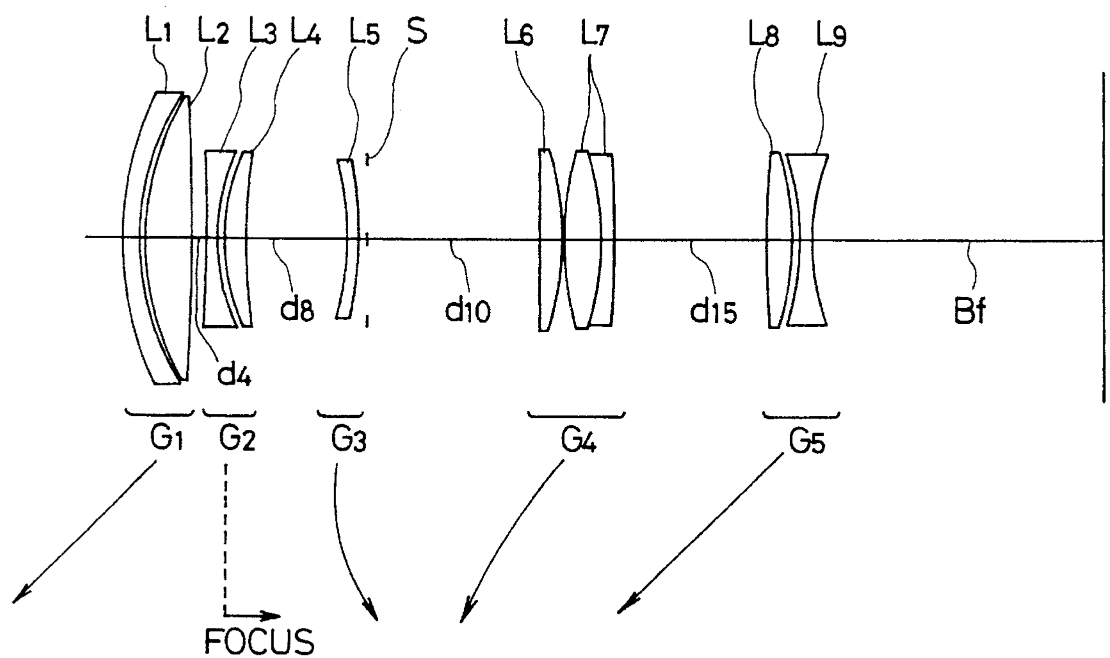
FIG. 1 is a lens system diagram showing the arrangement of lenses in a first embodiment of the present invention and the manner in which the respective lens groups are moved during the period of zooming and focusing, respectively.

Preferred embodiments of the present invention will now be described in detail with reference to the accompanying drawings.

FIGS. 1 to 5 are lens system diagrams showing respectively first to fifth embodiments of the present invention in which arranged in the order from the object side are a first lens group G1 having a positive refracting power, a second lens group G2 having a negative refracting power, a third lens group G3 having a negative refracting power, a fourth lens group G4 having a positive refracting power and a fifth lens group G5 having a negative refracting power whereby during the period of zooming, with the second lens group G2 being left stationary, the first and third lens groups G1 and G3 are moved to vary the lens group spacing between each of them and the second lens group G2 and the third, fourth and fifth lens groups G3, G4 and G5 are moved relative to one another to vary the lens group spacing therebetween, and during the period of focusing only the second lens group G2 is moved so as to vary the lens spacing between the second lens group G2 and the first and third lens groups G1 and G3, respectively.

Generally, with a thin-lens approximate optical system, where there are arranged in the order from the object side an object-side lens group (A) taking no part in the focusing and a focusing lens group (F) taking part in the focusing and there is further arranged on the image side an image-side lens group (B), if fA represents the focal length of the object-side lens group A, fF the focal length of the focusing lens group (F), βF the lateral magnification of the focusing lens group (F) at the infinite photographing distance, ΔX the amount of lens movement to focus the object of a photographing distance R (the distance between the object and the image plane) (in this case, the movement from the object side to the image side is designated as positive), TL the length of the whole lens system extending from the principal point on object side of the object-side lens group (A) to the image plane, and D0 the distance between the principal point on object side of the object-side lens group (A) to the obejct, the amount of movement ΔX for focusing in given by the following equation as described on pages 359 to 366, No. 5, Vol. 12, Oct. 1983 of "Optics" (a new focusing method for zoom lenses)

$$(R-TL-fA)\Delta X = (D0-fA)\Delta X = \frac{fA^2(\Delta X+\beta F\times fF)}{\Delta X\{\Delta X+(\beta F^2-1)(fF/\beta F)\}} \quad (a)$$

Equation (a) is approximately rewritten into the following quation $$(R-TL-fA)\Delta X = \frac{fA^2\times\beta F^2}{(\beta F^2-1)} = \frac{fA^2}{(1-1/\beta F^2)} \quad (b)$$

When considering the focusing lens group (F), if the focal length fA of the object-side lens group (A) is constant during zooming and simultaneously the amount of variation in the length TL of the whole lens system is sufficiently small as compared with the photographing distance R, consideration on the basis of equation (b) of the relation between the lateral magnification (always assuming $|\beta|>1$) of the focusing lens group (F) varying as it is moved from the wide-angle end to the telephoto end and its amount of movement ΔX shows that the following three cases are conceivable.

① Where the magnification β monotonously decreases from the wide-angle end to the telephoto end and there always is the relation $\beta<-1$, the amount of movement ΔX is decreased in response to the movement from the wide-angle end to the telephoto end.

② Where the magnification β monotonously decreases from the wide-angle end to the telephoto end and there always exists the relation $\Delta>1$, the amount of movement ΔX increases in response to the movement from the wide-angle end to the telephoto end.

③ Where the afocal relation ($|\beta|=\infty$) appears in the course from the wide-angle end to the telephoto end, there exists the minimum value for the amount of movement ΔX in the intermediate region of the focal length.

Thus, to realize a zoom lens of the inner focus system, from the foregoing it is necessary to consider the maximum amount of movement ΔX of the focusing lens group (F) at each of the focal lengths of the whole lens system and to ensure the air spacing between the focusing lens group (F) and the image-side lens group (B).

Then, in order to achieve a zoom lens of the inner focus system according to the present invention, it is desirable to satisfy the following conditional expression $$\beta 2\ min > 1.7 \quad (1)$$

where $\beta 2$ min represents the minimum value of the working magnification $|\beta 2|$ at infinity of the second lens group G2 or the focusing lens group.

Expression (1) determines the proper working magnification of the focusing lens group or the second lens group G2 for the close-up photographing at each of the focal lengths. If the magnification is less than the lower limit of expression (1), the amount of movement of the second lens group G2 becomes excessively large and not desirable.

For instance, where $\beta 2$ min corresponds to the telephoto end, the amount of movement $\Delta X$ of the second lens G2 for the close-up photographing at the telephoto end is increased as compared with the case of the photographing at the wide-angle end and therefore the air spacing between the second lens group G2 and the third lens group G3 at the telephoto end must be increased. As a result, the whole length at the telephoto end is increased and also there is the effect of increasing the effective diameter of the first lens group G1 or decreasing the ambient light quantity.

On the other hand, where $\beta 2$ min corresponds to the wide-angle end, conversely the amount of movement $\Delta X$ of the second lens group G2 for the close-up photographing at the wide-angle end is increased as compared at the telephoto end and thus the air spacing between the second and third lens groups G2 and G3 at the wide-angle end must be increased. Therefore, the whole length at the wide-angle end is increased and this gives rise to a difficulty with respect to portability. In addition, there is the effect of increasing the variations in the amount of movement of the second lens group G2 at the respective focal lengths of the whole lens system for the same photographing distance thus affecting the accuracy of the focusing cam mechanism and making the manufacture difficult.

Also, in order to achieve a compact zoom lens of the inner focus system, the following conditional expression must be satisfied $$0.3 < \frac{f1^2 \times \beta\, 2\min^2}{R\min \times M23 \times (\beta\, 2\min^2 - 1)} < 0.8 \quad (2)$$

where $\beta 2$ min=the minimum value of the lateral magnification $|\beta 2|$ of the second lens group at infinity f1=the focal length of the first lens group G1

M23=the air spacing at infinity between the second and third lens groups G2 and G3 at the focal length of the whole lens system where the lateral magnification of the second lens group G2 becomes $\beta 2$ min Rmin=the closest photographing distance (shortest object to image plane distance)

Expression (2) is one which prevents increase in the whole length while ensuring the photographing distance up to the nearest range and the moving space of the focusing lens group.

If the upper limit of expression (2) is exceeded, it becomes difficult to ensure the moving space of the second lens group G2 at the closest photographing distance Rmin so that the air spacing between the second and third lens groups G2 and G3 must be increased and this results in an increase in the whole length. Also, there is the disadvantage that since the amount of movement of the second lens group G2 is increased relatively, the focusing speed is decreased in cases where it is used for automatic focusing purposes. On the contrary, if the lower limit of expression (2) is exceeded, while the moving space of the second lens group G2 is fully ensured, there are undesirable effects in that the refracting power of the first lens group G1 becomes excessively strong and the variations of various aberrations, particularly variation of the spherical aberration at the telephoto end is increased, thus making it necessary to increase the number of the lenses constituting the first lens group G1 and tending to result in an increase in the weight of the lens on the whole.

Further, in order to achieve the compact inner-focus zoom lens, it is desirable to satisfy the following conditions $$0.4 < f2/f3 < 2.1 \quad (3)$$

$$0.3 < |f23|/fW < 1.0 \quad (4)$$

$$0.5 < f1/(fW \cdot fT)^{1/2} < 1.2 \quad (5)$$

where f1=the focal length of first lens group G1 f2=the focal length of second lens group G2 f3=the focal length of third lens group G3 f23=the composite focal length at infinity of the second and third lens groups G2 and G3 at the wide-angle end fW=the focal length of the whole lens system at the wide-angle end fT=the focal length of the whole lens system at the telephoto end Expression (2) determines the proper ratio of the focal length f2 of the second lens group G2 to the focal length f3 of the third lens group G3. If the upper limit of expression (2) is exceeded, the focal length of the second lens group G2 is increased so that variation in the amount of movement of the second lens group G2 due to zooming at a given photographing distance is increased and an inconvenience is caused in terms of the accuracy of the focusing cam. It is also undesirable in that it is difficult to ensure the moving space of the second lens group G2 at the telephoto end and the closest photographing distance is increased. On the contrary, if the lower limit of expression (3) is exceeded., the focal length of the second lens group G2 is excessively decreased so that at a given photographing distance, the amount of movement of the second lens group G2 at the wide-angle end is increased as compared with that at the telephoto end and thus the moving space of the second lens group G2 at the wide-angle end must be increased over that at the telephoto end, thus causing an increase in the whole length at the wide-angle end. Also, in response to the movement toward the telephoto end the spherical aberration becomes excessively negative, and during the period of focusing variation of the astigmatism is increased and compensation becomes difficult in response to the movement from infinity toward a close distance.

Expression (4) determines the proper ranges for the focal length fW of the whole lens system at the wide-angle end and the composite focal length f23 of the focal length f2 of the second lens group G2 and the focal length f3 of the third lens group G3 at the wide-angle end. If the upper limit of expression (4) is exceeded, the zooming action due to the zooming by the second lens group G2 and the third lens group G3 is deteriorated so that the rate of increase in the whole length from the wide-angle end to the telephoto end is increased thus giving rise to difficulties such as tending to cause a problem of eccentricity in connection with the strength of the lens barrel. Thus, this is not desirable. On the contrary, if the lower limit of expression (4) is exceeded, this results in increase in the diameters of the third lens group G3 and those that follow. Also, not only particularly the spherical aberration at the wide-angle is deteriorated but also the back focus becomes unnecessarily long and the whole length at the wide-angle end is increased. Thus, this is undesirable.

Expression (5) determines the proper ranges with respect to the focal length fW of the whole lens system at the wide-angle end, the focal length fT of the whole lens system at the telephoto end and the focal length f1 of the first lens group G1. If the upper limit of expression (5) is exceeded, the whole length at the telephoto end is increased and this is contrary to the intention of making the lens more compact. This also has undesirable effects of causing an insufficient light quantity and increase in the front lens diameter at the telephoto end. On the other hand, if the lower limit of expression (5) is exceeded, the focal length f1 of the first lens group G1 is decreased excessively so that the spherical aberration at the telephoto end is insufficiently compensated and also variation in the curvature of field during zooming becomes exceedingly large. In addition, the magnitude of the imaging magnification at the telephoto end due to the lens system including the second lens group G2 et seq., in increased excessively so that the axial chromatic aberration caused by the first lens group G1 is increased, thus failing to obtain an excellent imaging performance.

Further, in order to achieve a high-performance inner-focus zoom lens, it is desirable to satisfy the following conditions $$0.5<|f5|/fW<1.0 \quad (6)$$

$$0.4<f4/|f5|<1.0 \quad (7)$$

where f4=the focal length of fourth lens group f5=the focal length of fifth lens group Conditional expression (6) determines the proper range of the focal length f5 of the fifth lens group G5 with respect to the focal length fW of the whole lens system at the wide-angle end. If the upper limit of expression (6) is exceeded, not only the back focus becomes unnecessarily large and the whole length is increased but also the amount of movement of the fifth lens group G5 during the period of zooming is increased, thereby making it difficult to ensure the spacing between the fourth and fifth lens groups G4 and G5 at the telephoto end. Also, the Petzval sum becomes positively excessive and the astigmatism is increased. On the contrary, if the lower limit of expression (6) is exceeded, it becomes difficult to ensure the back focus and moreover the distortion aberration becomes excessive positively. Also, the Petzval sum becomes negative excessively thereby deteriorating the astigmatism.

Expression (7) determines the proper ratio with respect to the magnitudes of the focal length f4 of the fourth lens group G4 and the focal length f5 of the fifth lens group G5. If the upper limit of expression (7) is exceeded, the focal length f5 of the fifth lens group G5 is decreased excessively so that the astigmatism at the wide-angle end is increased and the distortion aberration is greatly shifted in the positive direction at either of the wide-angle end and the telephoto end, thereby causing the Petzval sum to bias in the negative direction and thus failing to ensure an excellent aberration balance during zooming. On the contrary, if the lower limit of expression (7) is exceeded, the focal length f4 of the fourth lens group G4 is decreased excessively and the spherical aberration is increased throughout the whole range during zooming. Thus, this is not desirable.

The arrangement of its lenses and the manner in which the respective lens groups are moved during the period of zooming and focusing, respectively, will now be described in greater detail with respect each of the embodiments.

Referring to FIG. 1, there is illustrated a first embodiment including, as arranged in the order from the object side, a positive or first lens group G1 composed of a negative meniscus lens $L_1$ whose convex surface faces the object side and an equiconvex positive lens $L_2$, a negative or second lens group G2 composed of an equiconcave negative lens $L_3$ and a positive meniscus lens $L_4$ whose convex surface is directed to the object side, a negative or third lens group G3 composed of a negative meniscus lens $L_5$ whose concave surface is directed to the object side, a positive or fourth lens group G4 composed of a positive meniscus lens $L_6$ whose convex surface is directed to the image side and a laminated positive lens $L_7$ made by gluing together an equiconvex positive lens and a negative meniscus lens, and a negative or fifth lens group G5 composed of an equiconvex positive $L_8$ and an equiconcave negative lens $L_9$.

In accordance with the first embodiment, during the period of focusing from infinity to a closest distance only the second lens group G2 is moved to the image side as shown in FIG. 1. Also, during the period of zooming from the wide-angle end to the telephoto end, with the second lens group G2 being placed in a stationary condition, the first lens group G1 is moved to the object side so as to increase the group spacing between it and the second lens group G2 and the third lens group G3 is moved in such a manner that on the wide-angle side it is moved to the object side to decrease the group spacing between it and the second lens group G2 and on the telephoto side it is moved to increase the group spacing between it and the second lens group G2. The fourth and fifth lens groups G4 and G5 are both moved to the object side so as to mutually decrease the group spacing.

Shown below are the various data of the first embodiment of the present invention. In the data tables of the embodiment, designated by f are focal lengths, $F_{NO}$ F-numbers, and 2ω angular fields. Also, the numerals at the left end indicate the orders from the object side, r the radiuses of curvature of the lens surfaces, d the lens thicknesses or lens surface spacings, ν the Abbe numbers of the lenses, n the refractive indices of the lenses at d line (λ=587.6 nm), β the photographing magnifications at the closest distances, d0 the distances from the objects to the most-object-side surfaces, and Bf the back focuses.

TABLE 1

[first embodiment]
f = 82.0 ~ 196.0
$F_{NO}$ = 4.6 ~ 5.7
2ω = 28.98 ~ 12.16

| | r | d | ν | n |
|---|---|---|---|---|
| 1 | 48.464 | 2.00 | 25.4 | 1.80518 |
| 2 | 35.624 | 0.70 | | |
| 3 | 37.996 | 6.00 | 70.1 | 1.51860 |
| 4 | −288.508 | (d4) | | |
| 5 | −578.364 | 1.50 | 52.3 | 1.74810 |
| 6 | 25.355 | 1.00 | | |
| 7 | 26.777 | 3.00 | 29.5 | 1.71736 |
| 8 | 87.319 | (d8) | | |
| 9 | −35.307 | 1.50 | 52.3 | 1.74810 |
| 10 | −56.440 | (d10) | | |
| 11 | 0.000 | 3.00 | 50.8 | 1.65844 |
| 12 | −39.665 | 0.20 | | |
| 13 | 43.053 | 5.00 | 70.1 | 1.51860 |
| 14 | −33.994 | 1.70 | 25.4 | 1.80518 |
| 15 | −146.495 | (d15) | | |
| 16 | 125.996 | 3.50 | 29.5 | 1.71736 |
| 17 | −36.572 | 1.00 | | |
| 18 | −35.907 | 1.50 | 49.4 | 1.77279 |
| 19 | 30.932 | (Bf) | | |

(Variable spacings in zooming)

| f | 82.0001 | 135.0002 | 196.0003 |
|---|---|---|---|
| D0 | ∞ | ∞ | ∞ |

TABLE 1-continued

| [first embodiment] f = 82.0 ~ 196.0 $F_{NO}$ = 4.6 ~ 5.7 2ω = 28.98 ~ 12.16 | | | |
|---|---|---|---|
| d4 | 1.7081 | 21.0456 | 36.7911 |
| d8 | 13.4838 | 13.3540 | 17.2532 |
| d10 | 24.1241 | 13.3204 | 3.0445 |
| d15 | 19.9208 | 11.5168 | 2.1481 |
| Bf | 44.3889 | 63.7265 | 79.4720 |
| β | −0.0659 | −0.1077 | −0.1550 |
| d0 | 1364.7742 | 1345.4367 | 1329.6912 |
| d4 | 10.4907 | 29.8570 | 46.3709 |
| d8 | 4.7012 | 4.5426 | 7.6734 |
| d10 | 24.1241 | 13.3204 | 3.0445 |
| d15 | 19.9208 | 11.5168 | 2.1481 |
| Bf | 44.3889 | 63.7265 | 79.4720 |

Note that the corresponding values to the conditions of the embodiment are as follows.

(1) $\beta 2$ min=3.700

(2) $(f1^2 \times \beta 2\ min^2)/Rmin \times M23 \times (\beta 2\ min^2 - 1) = 0.453$ (3) f2/f3=0.657

(4) |f23|/fW=0.587

(5) $f1/(fW \cdot fT)^{1/2} = 0.822$ (6) |f5|/fW=0.621

(7) f4/|f5|=0.759

Figure 2:
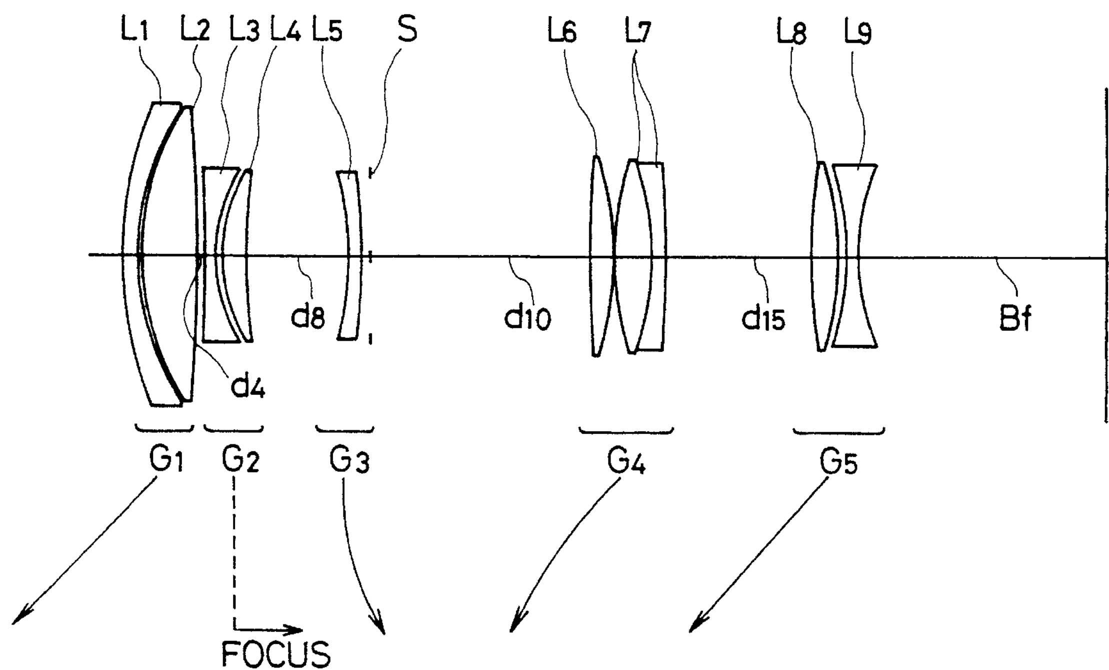
FIG. 2 is a lens system diagram showing the arrangement of lenses in a second embodiment of the present invention and the manner in which the respective lens groups are moved during the period of zooming and focusing, respectively.

Referring now to FIG. 2, there is illustrated a second embodiment including, arranged in the order from the object side, a positive or first lens group G1 composed of a negative meniscus lens $L_1$ having a convex surface directed to the object side and an equiconvex positive lens $L_2$, a negative or second lens group G2 composed of a plano-concave negative lens $L_3$ and a positive meniscus lens $L_4$ whose convex surface is directed to the object side, a negative or third lens group G3 composed of a negative meniscus lens whose concave surface is directed to the object side, a positive or fourth lens group G4 composed of an equiconvex positive lens $L_6$ and a laminated positive lens $L_7$ made by gluing an equiconvex positive lens and a negative meniscus lens together, and a negative or fifth lens group G5 composed of an equiconvex positive lens $L_8$ and an equiconcave negative lens $L_9$.

The second embodiment is also so designed that during the period of focusing from infinity to the closest distance only the second lens group G2 is moved to the object side as shown in FIG. 2. Also, during the period of zooming from the wide-angle end to the telephoto end, with the second lens group G2 being held stationary, the first lens group G1 is moved to the object side to increase the group spacing between it and the second lens group G2 and the third lens group G3 is moved to the image side to increase the group spacing between it and the second lens group G2. The fourth lens group G4 and the fifth lens group G5 are both moved to the object side so as to mutually decrease the group spacing.

Shown below are the various data of the second embodiment of the present invention. In the data tables of this embodiment, designated by f are the focal lengths, $F_{NO}$ the F-numbers and 2ω the angular fields. The left-end numerals indicate the orders from the object side, r the radiuses of curvature of the lens surfaces, d the lens thicknesses or lens surface spacings, ν the Abbe numbers of the lenses, n the refractive indices of the lenses at d line (λ=587.6 nm), β the photographing magnifications at the closest distances, d0 the distances from the objects to the most-object-side surfaces, and Bf the back focuses.

TABLE 2

[second embodiment] f = 72.0 ~ 204.0 $F_{NO}$ = 4.1 ~ 5.7 2ω = 33.48 ~ 11.72

| | r | d | ν | n |
|---|---|---|---|---|
| 1 | 52.977 | 2.00 | 25.4 | 1.80518 |
| 2 | 37.217 | 0.50 | | |
| 3 | 38.774 | 7.00 | 64.1 | 1.51680 |
| 4 | −273.833 | (d4) | | |
| 5 | 0.000 | 1.50 | 55.6 | 1.69680 |
| 6 | 21.608 | 1.00 | | |
| 7 | 22.800 | 3.00 | 30.1 | 1.69895 |
| 8 | 64.302 | (d8) | | |
| 9 | −43.117 | 1.50 | 52.3 | 1.74810 |
| 10 | −103.293 | (d10) | | |
| 11 | 270.461 | 3.00 | 53.8 | 1.69350 |
| 12 | −45.926 | 0.20 | | |
| 13 | 43.718 | 5.00 | 70.1 | 1.51860 |
| 14 | −36.080 | 1.70 | 25.4 | 1.80518 |
| 15 | −201.171 | (d15) | | |
| 16 | 80.888 | 3.50 | 31.7 | 1.75692 |
| 17 | −43.802 | 1.00 | | |
| 18 | −43.117 | 1.50 | 49.5 | 1.74443 |
| 19 | 28.120 | (Bf) | | |

(Variable spacings in zooming)

| f | 72.0001 | 140.0002 | 204.0003 |
|---|---|---|---|
| D0 | ∞ | ∞ | ∞ |
| d4 | 0.8549 | 24.4941 | 40.2659 |
| d8 | 13.7406 | 15.2253 | 18.3728 |
| d10 | 30.6538 | 13.6228 | 4.1957 |
| d15 | 19.3116 | 11.2187 | 1.7264 |
| Bf | 48.6472 | 72.2865 | 88.0583 |
| β | −0.0479 | −0.0919 | −0.1327 |
| d0 | 1654.3919 | 1630.7527 | 1614.9810 |
| d4 | 9.6342 | 32.8625 | 49.1308 |
| d8 | 4.9612 | 6.8569 | 9.5079 |
| d10 | 30.6538 | 13.6228 | 4.1957 |
| d15 | 19.3116 | 11.2187 | 1.7264 |
| Bf | 48.6472 | 72.2865 | 88.0583 |

Note that the corresponding values to the conditions of the embodiment are as follows.

(1) $\beta 2$ min=3.961

(2) $(f1^2 \times \beta 2\ min^2)/Rmin \times M23 \times (\beta 2\ min^2 - 1) = 0.549$ (3) f2/f3=0.845

(4) |f23|/fW=0.586

(5) $f1/(fW - fT)^{1/2} = 0.923$ (6) |f5|/fW=0.912

(7) f4/|f5|=0.592

Figure 3:
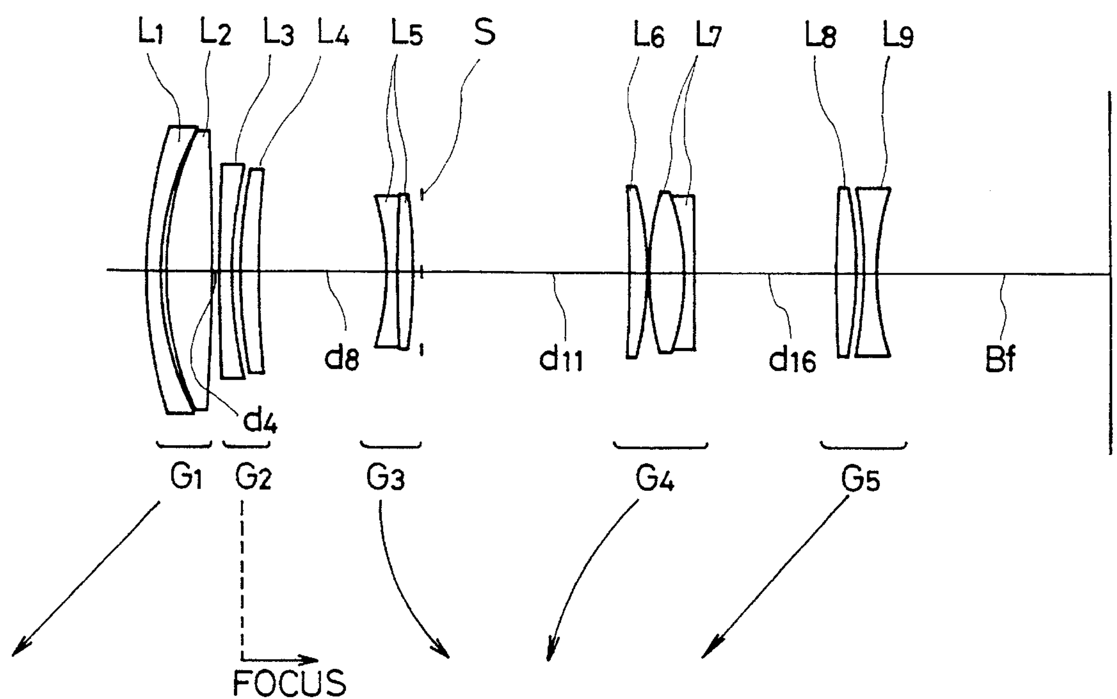
FIG. 3 is a lens system diagram showing the arrangement of lenses in a third embodiment of the present invention and the manner in which the respective lens groups are moved during the period of zooming and focusing, respectively.

Referring to FIG. 3, there is illustrated a third embodiment including, as arranged in the order from the object side, a positive or first lens group G1 composed of a negative meniscus lens $L_1$ whose convex surface is directed to the object side and an equiconvex positive lens $L_2$, a negative or second lens group G2 composed of a negative meniscus lens $L_3$ whose convex surface is directed to the object side and a positive meniscus lens $L_4$ whose convex surface is directed to the object side, a negative or third lens group G3 composed of a laminated negative lens $L_5$ made by gluing an equiconcave negative lens and an equiconvex positive lens together, a positive or fourth lens group G4 composed of a positive meniscus lens $L_6$ whose convex surface is directed to the image side and a laminated positive lens $L_7$ made by gluing an equiconvex positive lens and a negative meniscus lens together, and a negative or fifth lens group G5 composed of an equiconvex positive lens $L_8$ and an equiconcave negative lens $L_9$.

The third embodiment is also designed so that during the period of zooming from infinity to the closest distance, only the second lens group G2 is moved to the image side as shown in FIG. 3. On the other hand, during the period of zooming from the wide-angle end to the telephoto end, with the second lens group G2 being placed in a stationary state, the first lens group G1 is moved to the object side so as to increase the group spacing between it and the second lens group G2 and the third lens group G3 is moved to the image side so as to increase the group spacing between it and the second lens group G2. The fourth and fifth lens groups G4 and G5 are both moved to the object side so as to mutually decrease the group spacing.

Shown below are the various data of the third embodiment of the present invention. In the data tables of this embodiment, designated by f are the focal lengths, $F_{NO}$ the F-numbers, and 2ω the angular fields. Then, the left-end numerals designate the orders from the object side, r the radiuses of curvature of the lens surfaces, d the lens thicknesses or lens surface spacings, ν the Abbe numbers of the lens, n the refractive indices of the lenses at d line (λ=587.6 nm), β the photographing magnifications at the closest distances, d0 the distances from the objects to the most-object-side surfaces, and Bf the back focuses.

TABLE 3

[third embodiment]
f = 82.0 ~ 196.0
$F_{NO}$ = 4.6 ~ 5.7
2ω = 29.18 ~ 12.20

| | r | d | ν | n |
|---|---|---|---|---|
| 1 | 56.408 | 2.00 | 25.4 | 1.80518 |
| 2 | 41.650 | 0.50 | | |
| 3 | 44.449 | 5.80 | 64.1 | 1.51680 |
| 4 | −431.934 | (d4) | | |
| 5 | 607.826 | 1.50 | 52.3 | 1.74810 |
| 6 | 62.671 | 1.00 | | |
| 7 | 68.968 | 2.50 | 28.6 | 1.79504 |
| 8 | 130.884 | (d8) | | |
| 9 | −39.957 | 1.50 | 40.9 | 1.79631 |
| 10 | 237.119 | 2.00 | 25.5 | 1.80458 |
| 11 | −88.563 | (d11) | | |
| 12 | −550.854 | 2.50 | 60.3 | 1.62041 |
| 13 | −38.528 | 0.20 | | |
| 14 | 40.001 | 4.50 | 57.0 | 1.62280 |
| 15 | −32.042 | 1.30 | 28.6 | 1.79504 |
| 16 | 0.000 | (d16) | | |
| 17 | 247.854 | 2.70 | 26.1 | 1.78470 |
| 18 | −51.977 | 1.00 | | |
| 19 | −54.064 | 1.50 | 49.4 | 1.77279 |
| 20 | 32.155 | (Bf) | | |

(Variable spacings in zooming)

| f | 82.0001 | 135.0002 | 196.0004 |
|---|---|---|---|
| D0 | ∞ | ∞ | ∞ |
| d4 | 1.1868 | 22.3649 | 40.0861 |
| d8 | 16.9583 | 17.9175 | 20.8296 |
| d11 | 28.3704 | 14.4865 | 2.2849 |
| d16 | 18.2528 | 9.9993 | 1.5677 |
| Bf | 42.6110 | 63.7892 | 81.5104 |
| β | −0.0521 | −0.0859 | −0.1243 |
| d0 | 1662.1209 | 1640.9427 | 1623.2216 |
| d4 | 13.5570 | 36.6039 | 56.9165 |
| d8 | 4.5881 | 3.6785 | 3.9992 |

TABLE 3-continued

[third embodiment]
f = 82.0 ~ 196.0
$F_{NO}$ = 4.6 ~ 5.7
2ω = 29.18 ~ 12.20

| | | | |
|---|---|---|---|
| d11 | 28.3704 | 14.4865 | 2.2849 |
| d16 | 18.2528 | 9.9993 | 1.5677 |
| Bf | 42.6110 | 63.7892 | 81.5104 |

Note that the corresponding values to the conditions of the embodiment are as follows.

(1) β2 min=1.714

(2) $(f1^2 \times \beta 2\ min^2)/Rmin \times M23 \times (\beta 2\ min^2 - 1) = 0.653$ (3) f2/f3=2.019

(4) |f23|/fW=0.737

(5) $f1/(fW \cdot fT)^{1/2} = 1.003$ (6) |f5|/fW=0.636

(7) f4/|f5|=0.748

Figure 4:
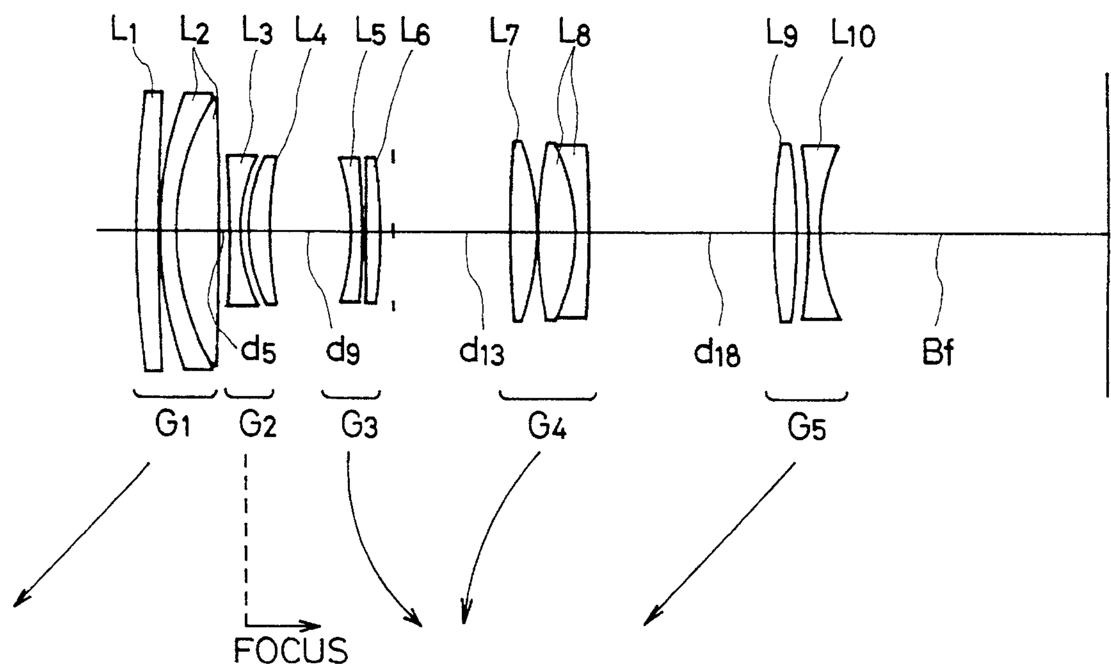
FIG. 4 is a lens system diagram showing the arrangement of lenses in a fourth embodiment of the present invention and the manner in which the respective lens groups are moved during the period of zooming and focusing, respectively.

Referring now to FIG. 4, there is illustrated a fourth embodiment including, as arranged in the order from the object side, a positive or first lens group G1 composed of a positive meniscus lens $L_1$ whose convex surface is directed to the obejct side and a laminated positive lens $L_2$ made by gluing together a negative meniscus lens whose convex surface is directed to the object side and an equiconvex positive lens, a negative or second lens group G2 composed of an equiconcave negative lens $L_3$ and a positive meniscus lens whose convex surface is directed to the object side, a negative or third lens group G3 composed of a nagative meniscus lens $L_5$ whose concave surface is directed to the object side and a plano-convex positive lens $L_6$ whose convex surface is directd to the image side, a positive or fourth lens group G5 composed of an equiconvex positive lens $L_7$ whose convex surface of a greater curvature is directed to the image side and a laminated positive lens $L_8$ made by gluing together an equiconvex positive lens and a negative meniscus lens, and a negative or fifth lens group G5 composed of an equiconvex positive lens $L_9$ and an equiconcave negative lens $L_{10}$.

The fourth embodiment is also designed so that during the period of focusing from infinity to the closest distance only the second lens group G2 is moved to the image side as shown in FIG. 4. On the other hand, during the period of zooming from the wide-angle end to the telephoto end, with the second lens group G2 being held stationary, the first lens group G1 is moved to the object side so as to increase the group spacing between it and the second lens group G2 and the third lens group G3 is moved to the image side so as to increase the group spacing between it and the second lens group G2. The fourth and fifth lens groups G4 and G5 are both moved to the object side so as to mutually decrease the group spacing.

Shown below are the various data of the fourth embodiment of the present invention. In the data tables of this embodiment, designated by f are the focal lengths, $F_{NO}$ the F-numbers, and 2ω the angular fields. Then, the left-end numerals designate the orders from the object side, r the radiuses of curvature of the lens surfaces, d the lens thicknesses or the lens surface spacings, ν the Abbe numbers of the lens, n the refractive indices of the lenses at d line (λ=587.6 nm), β the photographing magnifications at the closest distances, d0 the distances from the objects to the most-object-side surfaces, and Bf the back focuses.

TABLE 4

| [fourth embodiment] f = 82.0 ~ 196.0 $F_{NO}$ = 4.6 ~ 5.7 2ω = 28.54 ~ 12.04 | | | | |
|---|---|---|---|---|
| | r | d | ν | n |
| 1 | 114.670 | 3.00 | 64.1 | 1.51680 |
| 2 | 506.941 | 0.10 | | |
| 3 | 52.669 | 2.00 | 25.4 | 1.80518 |
| 4 | 35.719 | 5.50 | 64.1 | 1.51680 |
| 5 | −1600.095 | (d5) | | |
| 6 | −376.167 | 1.50 | 52.3 | 1.74810 |
| 7 | 22.853 | 1.00 | | |
| 8 | 23.243 | 3.00 | 31.1 | 1.68893 |
| 9 | 61.485 | (d9) | | |
| 10 | −29.889 | 1.50 | 40.9 | 1.79631 |
| 11 | −170.288 | 0.50 | | |
| 12 | 0.000 | 2.00 | 25.5 | 1.80458 |
| 13 | −68.957 | (d13) | | |
| 14 | 183.640 | 3.50 | 60.8 | 1.56384 |
| 15 | −37.143 | 0.20 | | |
| 16 | 56.506 | 5.00 | 57.0 | 1.62280 |
| 17 | −25.791 | 1.70 | 28.6 | 1.79504 |
| 18 | −180.105 | (d18) | | |
| 19 | 75.787 | 3.00 | 27.8 | 1.69911 |
| 20 | −75.959 | 1.50 | | |
| 21 | −76.242 | 1.50 | 49.4 | 1.77279 |
| 22 | 26.698 | (Bf) | | |

(Variable spacings in zooming)

| f | 82.0001 | 135.0002 | 196.0004 |
|---|---|---|---|
| D0 | ∞ | ∞ | ∞ |
| d5 | 1.4756 | 18.5672 | 34.3080 |
| d9 | 10.6218 | 11.4764 | 13.9052 |
| d13 | 17.0111 | 7.9263 | 3.0814 |
| d18 | 23.9488 | 15.0875 | 1.7628 |
| Bf | 42.1244 | 59.2160 | 74.9569 |
| β | −0.0661 | −0.1071 | −0.1533 |
| d0 | 1368.3183 | 1351.2267 | 1335.4859 |
| d5 | 8.3461 | 24.9879 | 41.1932 |
| d9 | 3.7513 | 5.0557 | 7.0200 |
| d13 | 17.0111 | 7.9263 | 3.0814 |
| d18 | 23.9488 | 15.0875 | 1.7628 |
| Bf | 42.1244 | 59.2160 | 74.9569 |

Note that the corresponding values to the conditions of this embodiment are as follows.

Figure 5:
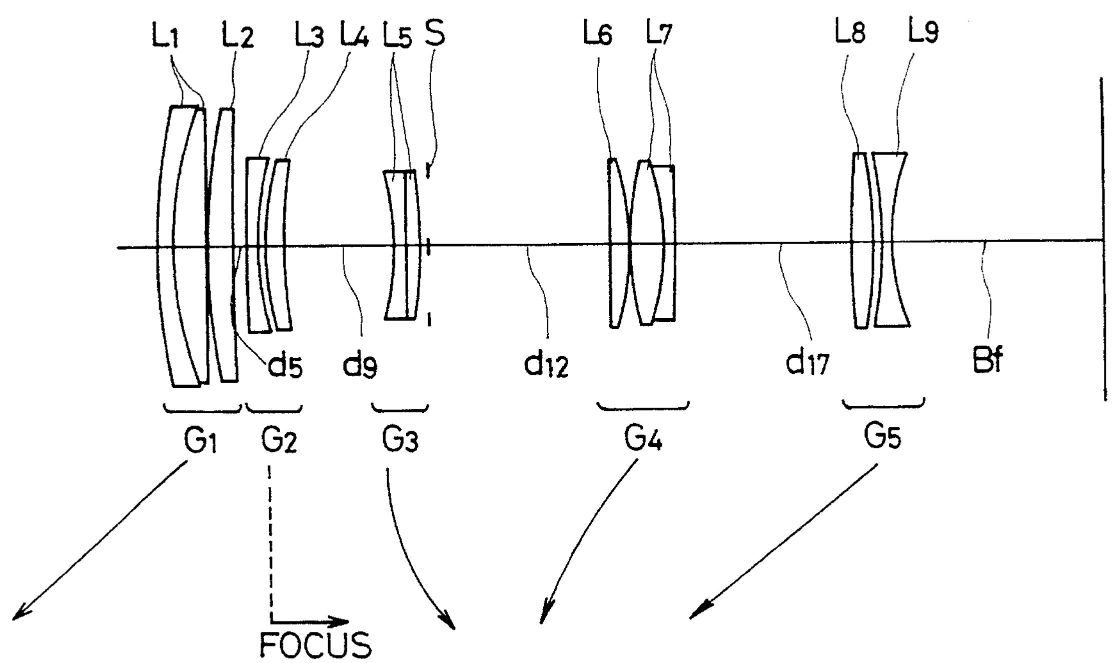
FIG. 5 is a lens system diagram showing the arrangement of lenses in a fifth embodiment of the present invention and the manner in which the respective lens groups are moved during the period of zooming and focusing, respectively.

(1) $\beta 2\ min=3.523$ (2) $(f1^2\times\beta 2\ min^2)/Rmin\times \mathbf{M23}\times(\beta 2\ min^2-1)=0.553$ (3) $f\mathbf{2}/f\mathbf{3}=0.605$ (4) $|f\mathbf{23}|/fW=0.455$ (5) $f\mathbf{1}/(fW\cdot fT)^{1/2}=0.710$ (6) $|f\mathbf{5}|/fW=0.646$ (7) $f4/|f\mathbf{5}|=0.702$ Referring now to FIG. 5, there is illustrated a fifth embodiment including, as arranged in the order from the object side, a positive or first lens group G1 composed of a laminated positive lens $L_1$ made by gluing together a negative meniscus lens whose convex surface is directed to the object side and a plano-convex lens whose convex surface is directed to the object side and a positive meniscus lens $L_2$ whose convex surface is directed to the object side, a negative or second lens group G2 composed of a negative meniscus lens $L_3$ whose convex surface is directed to the object side and a positive meniscus lens $L_4$ whose convex surface is directed to the object side, a negative or third lens group G3 composed of a laminated negative lens $L_5$ made by gluing an equiconcave negative lens and an equiconvex positive lens together, a positive or fourth lens group G4 composed of a positive meniscus lens $L_6$ whose convex surface is directed to the image side and a laminated positive lens $L_7$ made by gluing together an equiconvex positive lens and a negative meniscus lens whose convex surface is directed to the image side, and a negative or fifth lens group G5 composed of an equiconvex positive lens $L_8$ and an equiconcave negative lens $L_9$.

This fifth embodiment is also designed so that during the focusing from infinity to the closest distance, only the second lens group G2 is moved to the image side as shown in FIG. 5. On the other hand, during the period of zooming from the wide-angle end to the telephoto end, with the second lens group G2 being held stationary, the first lens group G1 is moved to the object side so as to increase the group spacing between it and the second lens group G2 and the third lens group G3 is moved to the image side so as to increase the group spacing between it and the second lens group G2. The fourth and fifth lens group G4 and G5 are both moved to the object side to mutually decrease the group spacing.

Shown below are the various data of the fifth embodiment of the present invention. In the data tables of this embodiment, designated by f are the focal lengths, $F_{NO}$ the F-numbers, and 2ω the angular fields. Then, the left-end numerals designate the orders from the object side, r the radiuses of curvature of the lens surfaces, d the lens thicknesses or the lens surface spacings, ν the Abbe numbers of the lenses, n the refractive indices of the lenses at d line (λ=587.6 nm), β the photographing magnifications at the closest distances, d0 the distances from the objects to the most-object-side surfaces, and Bf the back focuses.

TABLE 5

| [fifth embodiment] f = 82.0 ~ 196.0 $F_{NO}$ = 4.6 ~ 5.7 2ω = 29.02 ~ 12.18 | | | | |
|---|---|---|---|---|
| | r | d | ν | n |
| 1 | 94.429 | 2.00 | 25.4 | 1.80518 |
| 2 | 59.382 | 4.00 | 64.1 | 1.51680 |
| 3 | 0.000 | 0.20 | | |
| 4 | 93.865 | 3.40 | 64.1 | 1.51680 |
| 5 | 628.285 | (d5) | | |
| 6 | 421.322 | 1.50 | 52.3 | 1.74810 |
| 7 | 48.901 | 1.00 | | |
| 8 | 46.635 | 2.50 | 28.6 | 1.79504 |
| 9 | 77.187 | (d9) | | |
| 10 | −35.631 | 1.50 | 40.9 | 1.79631 |
| 11 | 233.897 | 2.00 | 25.5 | 1.80458 |
| 12 | −73.806 | (d12) | | |
| 13 | −635.118 | 2.50 | 60.3 | 1.62041 |
| 14 | −37.954 | 0.20 | | |
| 15 | 48.573 | 4.50 | 57.0 | 1.62280 |
| 16 | −30.436 | 1.30 | 28.6 | 1.79504 |
| 17 | −406.476 | (d17) | | |
| 18 | 185.445 | 2.70 | 26.1 | 1.78470 |
| 19 | −65.898 | 1.00 | | |
| 20 | −73.338 | 1.50 | 49.4 | 1.77279 |
| 21 | 32.627 | (Bf) | | |

(Variable spacings in zooming)

| f | 82.0001 | 135.0003 | 196.0004 |
|---|---|---|---|
| D0 | ∞ | ∞ | ∞ |
| d5 | 1.8446 | 22.7861 | 40.5469 |
| d9 | 14.4711 | 15.4045 | 18.2995 |
| d12 | 25.4004 | 13.1401 | 2.9565 |
| d17 | 23.3187 | 13.7042 | 3.2318 |
| Bf | 40.3196 | 61.2611 | 79.0220 |

TABLE 5-continued

| [fifth embodiment] f = 82.0 ~ 196.0 $F_{NO}$ = 4.6 ~ 5.7 2ω = 29.02 ~ 12.18 | | | |
|---|---|---|---|
| β | −0.0522 | −0.0859 | −0.1242 |
| d0 | 1662.8456 | 1641.9042 | 1624.1433 |
| d5 | 11.9078 | 34.1651 | 53.9303 |
| d9 | 4.4080 | 4.0254 | 4.9161 |
| d12 | 25.4004 | 13.1401 | 2.9565 |
| d17 | 23.3187 | 13.7042 | 3.2318 |
| Bf | 40.3196 | 61.2611 | 79.0220 |

Note that the corresponding values to the conditions of this embodiment are as follows.

(1) β2 min=1.923

(2) $(f1^2 \times \beta 2\ min^2)/Rmin \leqq M23 \times (\beta 2\ min^2 - 1) = 0.601$ (3) f2/f3=1.653

(4) |f23|/fW=0.658

(5) $f1/(fW \cdot fT)^{1/2} = 0.948$ (6) |f5|/fW=0.706

(7) f4/|f5|=0.698

In accordance with all the embodiments, excellent imaging performance is ensured throughout the range from the wide-angle end to the telephoto end as well as for the photographying at the closest distances in the respective zooming regions.

Figure 6:
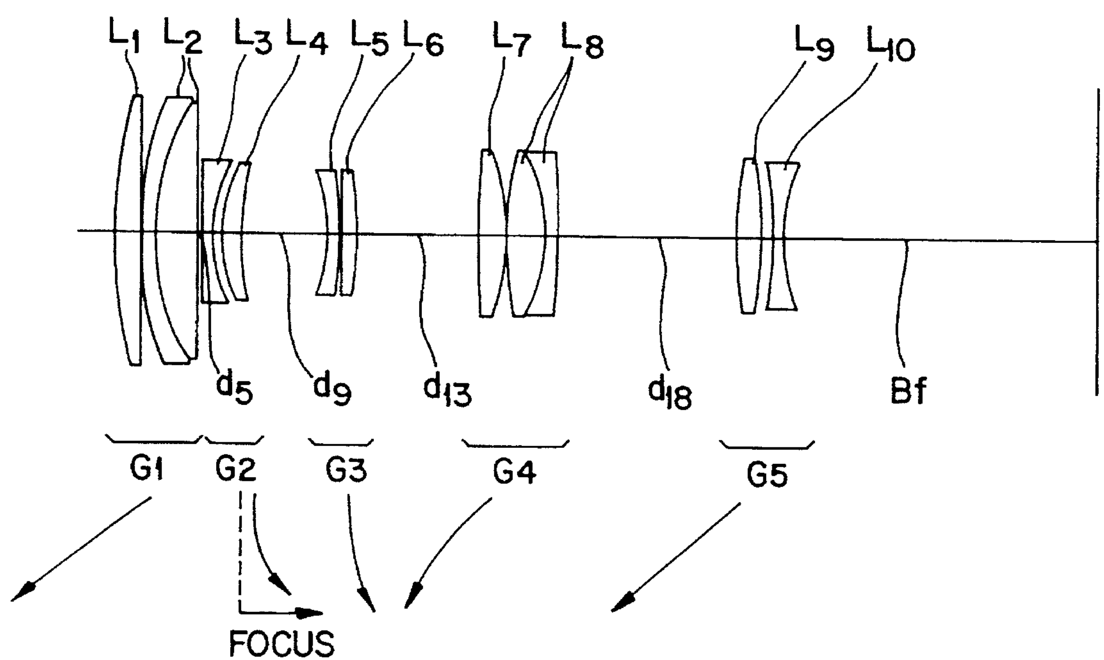
FIG. 6 is a lens system diagram showing the arrangement of lenses in sixth embodiment of the present invention and the manner in which the respective lens groups are moved during the period of zooming and focusing, respectively.

Referring now to FIG. 6, there is illustrated a sixth embodiment including, as arranged in the order from the object side, a positive or first lens group G1 composed of a positive lens $L_1$ and a laminated positive lens $L_2$ made by gluing together a negative meniscus lens and an equiconvex positive lens, a negative or second lens group G2 composed of an equiconcave negative lens $L_3$ and a positive meniscus lens $L_4$, a negative or third lens group G3 composed of a nagative meniscus lens $L_5$ a equiconvex positive lens $L_6$, a positive or fourth lens group G5 composed of an equiconvex lens $L_7$ and a laminated positive lens $L_8$ made by gluing together an equiconvex lens and a negative meniscus lens, and a negative or fifth lens group G5 composed of an equiconvex lens $L_9$ and an equiconcave leas $L_{10}$.

The zoom lens according to the sixth embodiment is also designed so that during the period of zooming from the wide-angle end to the telephoto end, the first, fourth fifth lens groups G1, G4 and G5 are moved along the optical axis to the object side, the second lens group G2 is moved along the optical axis to the image side and the third lens group G3 is moved non-linearly along the optical axis to the image side so as to effect the desired zooming operation. During close-up photographing, the second lens group G2 moved along the optical axis to the image side to effect the desired focusing.

Shown below are the various data of the sixth embodiment of the present invention. In the data tables of this embodiment, represented by f is the focal length, $F_{NO}$ the F-number, and 2ω the angular field. Then, the numerals on the left side indicate the orders from the object side, r represents the radius of curvature of the lens surface, d the lens thickness or the lens spacings, ν the Abbe number of the lens, n the refractive index of the lens at d line (λ=587.6 nm), β the photographic magnification at the closest distance, d0 the distance from the object to the most-object-side surface, and Bf the back focus.

TABLE 6

| [sixth embodiment] f = 82.0 ~ 196.0 $F_{NO}$ = 4.6 ~ 5.7 2ω = 28.58 ~ 12.04 | | | | |
|---|---|---|---|---|
| | r | d | ν | n |
| 1 | 94.038 | 3.00 | 64.1 | 1.51680 |
| 2 | 512.233 | 0.10 | | |
| 3 | 57.776 | 2.00 | 25.4 | 1.80518 |
| 4 | 37.426 | 5.50 | 64.1 | 1.51680 |
| 5 | 3734.553 | (d5) | | |
| 6 | −470.172 | 1.50 | 52.3 | 1.74810 |
| 7 | 23.281 | 1.00 | | |
| 8 | 22.960 | 3.00 | 31.1 | 1.68893 |
| 9 | 54.925 | (d9) | | |
| 10 | −27.555 | 1.50 | 40.9 | 1.79631 |
| 11 | −100.998 | 0.50 | | |
| 12 | −302.429 | 2.00 | 25.5 | 1.80458 |
| 13 | −60.730 | (d13) | | |
| 14 | 255.044 | 3.50 | 60.7 | 1.56384 |
| 15 | −37.584 | 0.20 | | |
| 16 | 56.259 | 5.00 | 57.0 | 1.62280 |
| 17 | −26.033 | 1.70 | 28.6 | 1.79504 |
| 18 | −146.737 | (d18) | | |
| 19 | 76.502 | 3.00 | 27.8 | 1.69911 |
| 20 | −66.793 | 1.50 | | |
| 21 | −63.459 | 1.50 | 49.4 | 1.77279 |
| 22 | 27.446 | (Bf) | | |

| | (Variable spacings in zooming) | | |
|---|---|---|---|
| f | 82.0001 | 135.0003 | 196.0001 |
| D0 | ∞ | ∞ | ∞ |
| d5 | 0.8822 | 18.8737 | 35.1065 |
| d9 | 11.1731 | 11.1731 | 13.8178 |
| d13 | 16.4334 | 7.6723 | 2.6060 |
| d18 | 24.1078 | 14.8773 | 1.0664 |
| Bf | 42.1734 | 58.5294 | 73.2864 |
| β | −0.0661 | −0.1069 | −0.1527 |
| d0 | 1368.7300 | 1352.3740 | 1337.6170 |
| d5 | 7.7526 | 25.2892 | 42.0643 |
| d9 | 4.3028 | 4.7577 | 6.8599 |
| d13 | 16.4334 | 7.6723 | 2.6060 |
| d18 | 24.1078 | 14.8773 | 1.0664 |
| Bf | 42.1734 | 58.5294 | 73.2864 |

Note that the corresponding values to the conditions of this embodiment are as follows.

(1) β2 min=3.523

(2) $(f1^2 \times \beta 2\ min^2)/Rmin \times M23 \times (\beta 2\ min^2 - 1) = 0.526$ (3) f2/f3=0.605

(4) |f23|/fW=0.455

(5) $f1/(fW \cdot fT)^{1/2} = 0.710$ (6) |f5|/fW=0.646

(7) f4/|f5|=0.702

From the foregoing it will be seen that in accordance with the present invention a zoom lens of the inner focus system is realized which ensures excellent imaging performance throughtout the whole zooming range.

What is claimed is:

1. A zoom lens utilizing an inner focus system comprising:

a first lens group having a positive refracting power;

a second lens group having a negative refracting power;

a third lens group having a negative refracting power;

a fourth lens group having a positive refracting power; and a fifth lens group having a negative refracting power;

said first to fifth lens groups being arranged in said order from an object side, whereby during the period of zooming, said first to fifth lens groups are moved relative to one another to mutually vary a lens group spacing therebetween, whereas during the period of focusing said second lens group is moved along an optical axis to vary a lens group spacing between said second lens group and said first and third lens groups, respectively.

2. A zoom lens according to claim 1, wherein said second lens group is constructed to satisfy the following condition $$\beta 2\ min > 1.7$$

where β2 min represents a minimum value for a working lateral magnfication |β2| of said second lens group at infinity.

3. A zoom lens according to claim 1, wherein said second lens group is further constructed to satisfy the following conditions $$0.3 < \frac{f1^2 \times \beta\ 2min^2}{Rmin \times M23 \times (\beta\ 2min^2 - 1)} < 0.8$$

where f1 is a focal length of the first lens group, $\beta 2\ min^2$ is a minimum value for a lateral magnification |β2| of the second lens group at infinity, Rmin is a closest photographing distance (minimum object to image plane distance), M23 is an air spacing at infinity between the second and third lens groups at a focal length of the whole lens system where the lateral magnification Of the second lens group attains β2 min.

4. A zoom lens according to claim 1, wherein said second and third lens groups are further constructed so as to satisfy the following conditions $$0.4 < f2/f3 < 2.1$$

$$0.3 < |f23|/fW < 1.0$$

where f2 is a focal length of the second lens group, f3 is a focal length of the third lens group, f23 is a composite focal length of the second and third lens groups at infinity at the wide-angle end, fW is a focal length of the whole lens system at the wide-angle end.

5. A zoom lens according to claim 1, wherein said first lens group is further constructed to satisfy the following condition $$0.5 < f1/ (FW \cdot fT)^{1/2} < 1.2$$

where f1 is a focal length of the first lens group, fW is a focal length of the whole lens system at the wide-angle end, fT is a focal length of the whole lens system at the telephoto end.

6. A zoom lens according to claim 1, wherein said fourth and fifth lens groups are further constructed so as to satisfy the following conditions $$0.5 < |f5|/fW < 1.0$$

$$0.4 < f4/|f5| < 1.0$$

where f4 is a focal length of the fourth lens group, f5 is a focal length of the fifth lens group, fW is a focal length Of the whole lens system at the wide-angle end.

7. A zoom lens according to claim 1, wherein during the period of zooming from a wide-angle end to a telephoto said first lens group is moved to said object side so as to increase a group spacing between said first lens group and said second lens group, said third lens group is moved in such a manner that a group spacing between said third lens group end said second lens group is increased at said telephoto end as compared with that at said wide-angle end, and said fourth and fifth lens groups are both moved relatively to said object side so as to mutually decrease a group spacing therebetween, whereas during the period of focusing from infinity to a near distance said second lens group is moved to an image side so as to decrease a group spacing between said second lens group and said third lens group.

8. A zoom lens according to claim 1, wherein in said order from the object side, said first lens group includes a negative meniscus lens whose convex surface is directed to said object side and an equiconvex positive lens, said second lens group includes at least a negative lens having a concave surface on an image side and a positive meniscus lens whose convex surface is directed to said object side, said third lens group includes a negative meniscus lens whose concave surface is directed to said object side, said fourth lens group includes at least a positive lens having a convex surface on said image side and a laminated positive lens of an equiconvex shape, and said fifth lens group includes an equiconvex positive lens and an equiconcave negative lens whereby said second lens group is moved to said image side to effect focusing over a range extending from infinity to a closest distance.

9. A zoom lens-according to claim 1, wherein in said order from the object side, said first lens group includes at least a laminated positive lens of a negative meniscus lens whose convex surface is directed to said object side and an equiconvex positive lens, said second lens group includes at least a negative lens having a concave surface on an image side and a positive meniscus lens whose convex surface is directed to said object side, said third lens group includes a negative meniscus lens whose concave surface is directed to said object side and a positive leans having a convex surface on said image side, said fourth lens group includes at least a positive lens having a convex surface on said image side and a laminated positive lens of an equiconvex shape whereby said second lens group is moved to said image side to effect focusing over a range extending from infinity to a nearest distance.

10. A zoom lens according claim 1 constructed accordance with the data stated as follows:

f = 82.0 ~ 196.0
$F_{NO}$ = 4.6 ~ 5.7
2ω = 28.58 ~ 12.04

| | r | d | ν | n |
|---|---|---|---|---|
| 1 | 94.038 | 3.00 | 64.1 | 1.51680 |
| 2 | 512.233 | 0.10 | | |
| 3 | 57.776 | 2.00 | 25.4 | 1.80518 |
| 4 | 37.426 | 5.50 | 64.1 | 1.51680 |
| 5 | 3734.553 | (d5) | | |
| 6 | −470.172 | 1.50 | 52.3 | 1.74810 |
| 7 | 23.281 | 1.00 | | |

-continued

| | f = 82.0 ~ 196.0<br>$F_{NO}$ = 4.6 ~ 5.7<br>2ω = 28.58 ~ 12.04 | | | |
|---|---|---|---|---|
| 8 | 22.960 | 3.00 | 31.1 | 1.68893 |
| 9 | 54.925 | (d9) | | |
| 10 | −27.555 | 1.50 | 40.9 | 1.79631 |
| 11 | −100.998 | 0.50 | | |
| 12 | −302.429 | 2.00 | 25.5 | 1.80458 |
| 13 | −60.730 | (d13) | | |
| 14 | 255.044 | 3.50 | 60.7 | 1.56384 |
| 15 | −37.584 | 0.20 | | |
| 16 | 56.259 | 5.00 | 57.0 | 1.62280 |
| 17 | −26.033 | 1.70 | 28.6 | 1.79504 |
| 18 | −146.737 | (d18) | | |
| 19 | 76.502 | 3.00 | 27.8 | 1.69911 |
| 20 | −66.793 | 1.50 | | |
| 21 | −63.459 | 1.50 | 49.4 | 1.77279 |
| 22 | 27.446 | (Bf) | | |

Variable spacings in zooming

| f | 82.0000 | 135.0000 | 196.0001 |
|---|---|---|---|
| D0 | ∞ | ∞ | ∞ |
| d5 | 0.8822 | 18.8737 | 35.1065 |
| d9 | 11.1731 | 11.1731 | 13.8178 |
| d13 | 16.4334 | 7.6723 | 2.6060 |
| d18 | 24.1078 | 14.8773 | 1.0664 |
| Bf | 42.1734 | 58.5294 | 73.2864 |
| β | −0.0661 | −0.1069 | −0.1527 |
| d0 | 1368.7300 | 1352.3740 | 1337.6170 |
| d5 | 7.7526 | 25.2892 | 42.0643 |
| d9 | 4.3028 | 4.7577 | 6.8599 |
| d13 | 16.4334 | 7.6723 | 2.6060 |
| d18 | 24.1078 | 14.8773 | 1.0664 |
| Bf | 42.1734 | 58.5294 | 73.2864 |

wherein f represents focal length, $F_{NO}$ represents F-number, 2ω represents angular field, the numerals on the left side indicate the order from the object side, r represents radius of curvature, d represents thickness or spacing, ν represents the Abbe number, n represents the refractive index, β represents the photographic magnification at the closest distance, d0 represents the distance from the object to the most-object-side surface, and Bf represents the back focus.

11. A zoom lens according to claim 1, wherein in said order from the object side, said first lens group includes a negative meniscus lens whose convex surface is directed to said object side and an equiconvex positive lens, said second lens group includes at least a negative lens having a concave surface on an image side and a positive meniscus lens whose convex surface is directed to said object side, said third lens group includes a negative lens of a negative meniscus shape whose concave surface is directed to said object side, said fourth lens group includes at least a positive lens having a convex surface on said image side and a positive lens of an equiconvex shape, and said fifth lens group includes an equiconvex positive lens and an equiconcave negative lens whereby said second lens group is moved to said side to effect focusing over a range extending from infinity to a closest distance.

12. A zoom lens according to claim 1, wherein in said order from the object side, said first lens group includes at least a positive lens of a negative meniscus lens whose convex surface is directed to said object side and a positive lens whose convex surface is directed to said object side, said second lens group includes at least a negative lens whose concave surface is directed to an image side and a positive meniscus lens whose convex surface is directed to said object side, said third lens group includes a negative lens of a negative meniscus shape whose concave surface is directed to said object side, said fourth lens group includes at least a positive lens whose convex surface is directed to said image side and a positive lens of an equiconvex shape, and said fifth lens group includes an equiconvex positive lens and an equiconcave negative lens whereby said second lens group is moved to said image side of effect focusing over a range extending from infinity to a closest distance.

* * * * *